United States Patent [19]
Losaw

[11] 3,815,551
[45] June 11, 1974

[54] HORSE WALKER

[76] Inventor: David D. Losaw, Rt. 1, Box 78, Littleton, Colo. 80120

[22] Filed: July 5, 1973

[21] Appl. No.: 377,751

[52] U.S. Cl. .................................. 119/29, 272/29
[51] Int. Cl. .......................................... A01k 15/00
[58] Field of Search ............ 119/29; 272/29, 39, 40, 272/41

[56] References Cited
UNITED STATES PATENTS

| | | | |
|---|---|---|---|
| 2,489,438 | 11/1949 | Schrader | 119/29 |
| 2,525,458 | 10/1950 | Peterson | 272/29 |
| 3,424,132 | 1/1969 | Fischer et al. | 119/29 |

Primary Examiner—Hugh R. Chamblee
Attorney, Agent, or Firm—Edwards, Spangler, Wymore & Klaas

[57] ABSTRACT

This invention relates to a foldable trailer mounted horse walker characterized by two or more, preferably four, radially extending booms, one of which is drivingly connected to an upright centrally located drive shaft while the others are pulled around by the driven one due to connecting cables strung therebetween. When in the stowed towable condition, the several booms are rotated around the central shaft and arranged in nested essentially coplanar relation.

17 Claims, 16 Drawing Figures

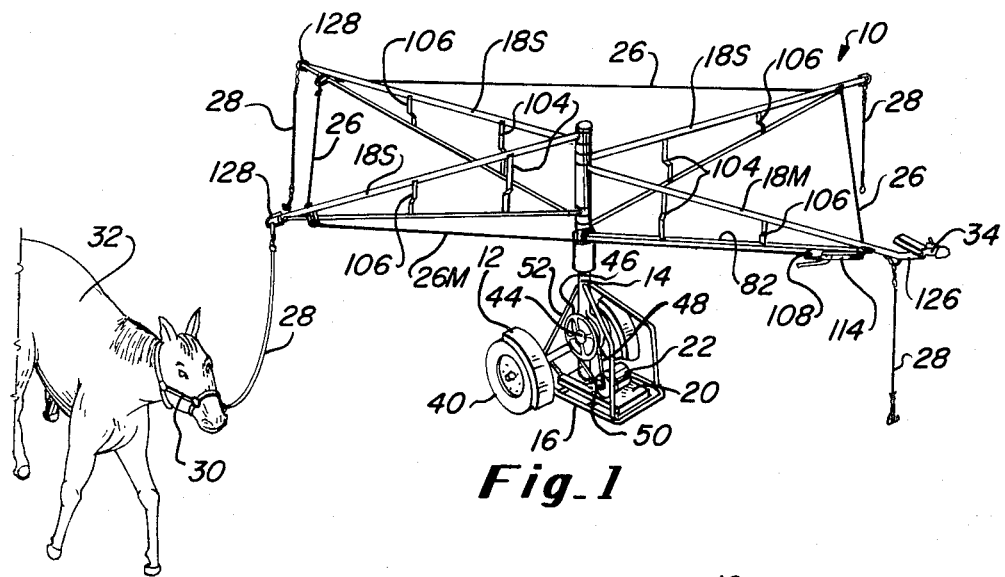
Fig_1
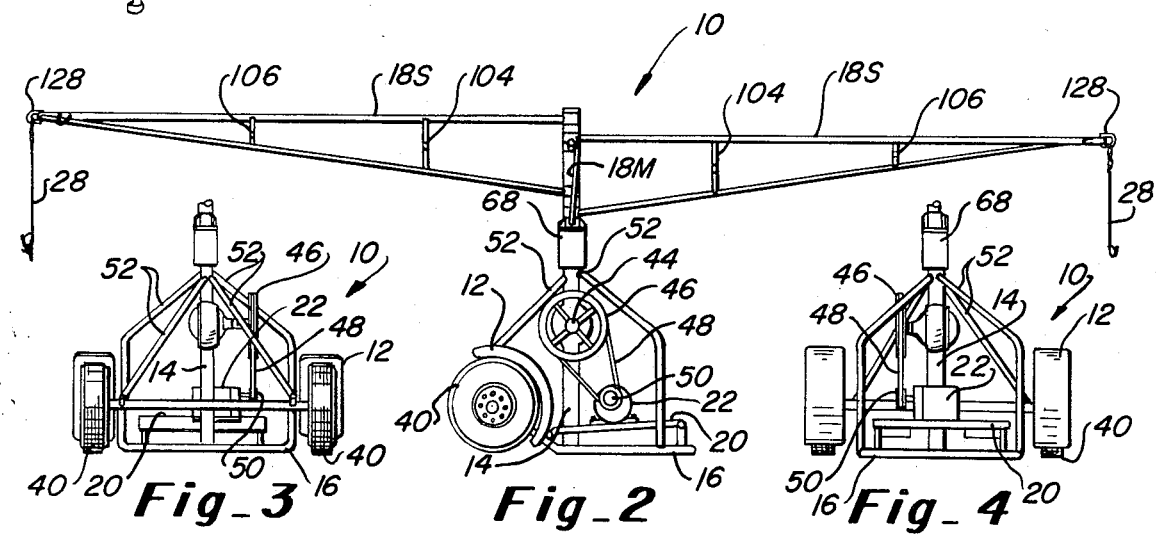
Fig_3  Fig_2  Fig_4
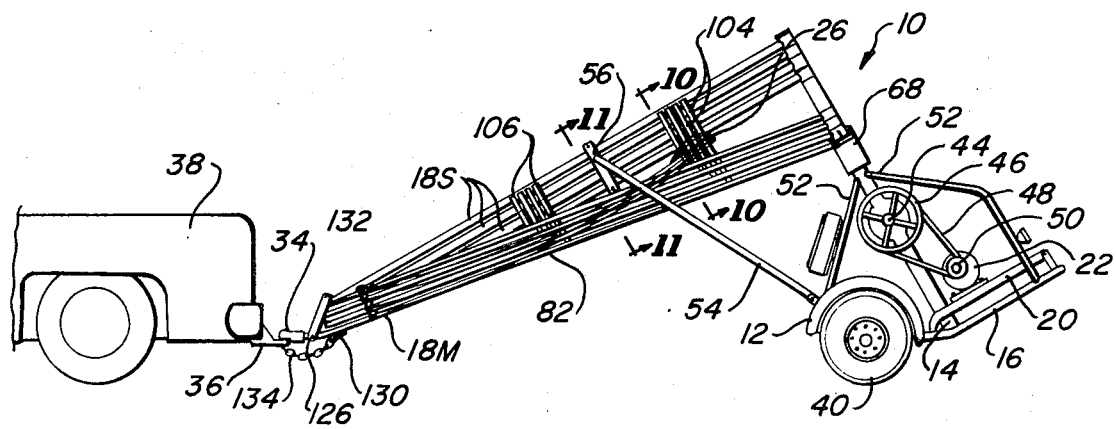
Fig_5

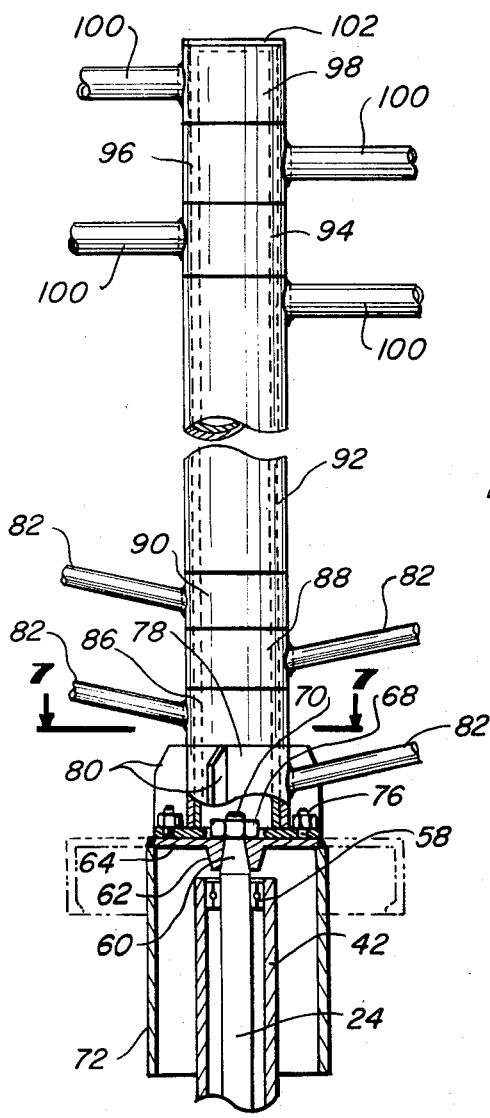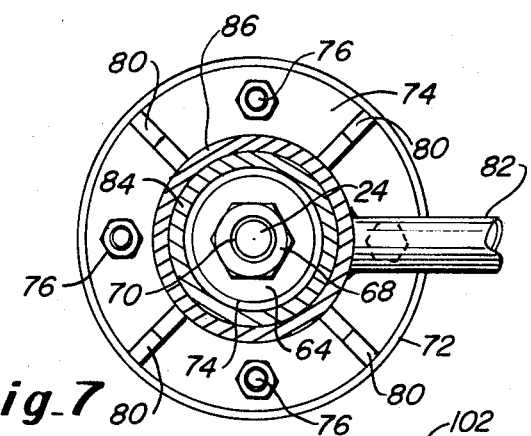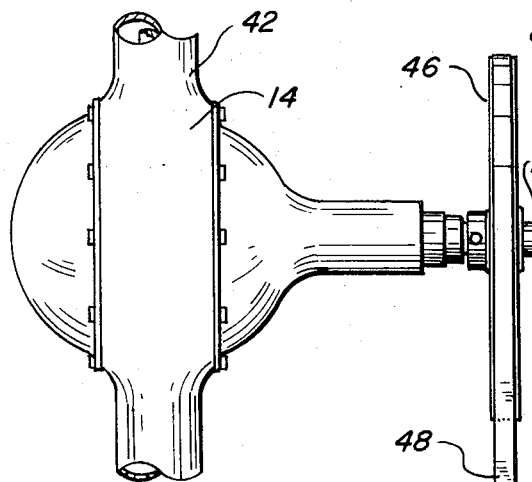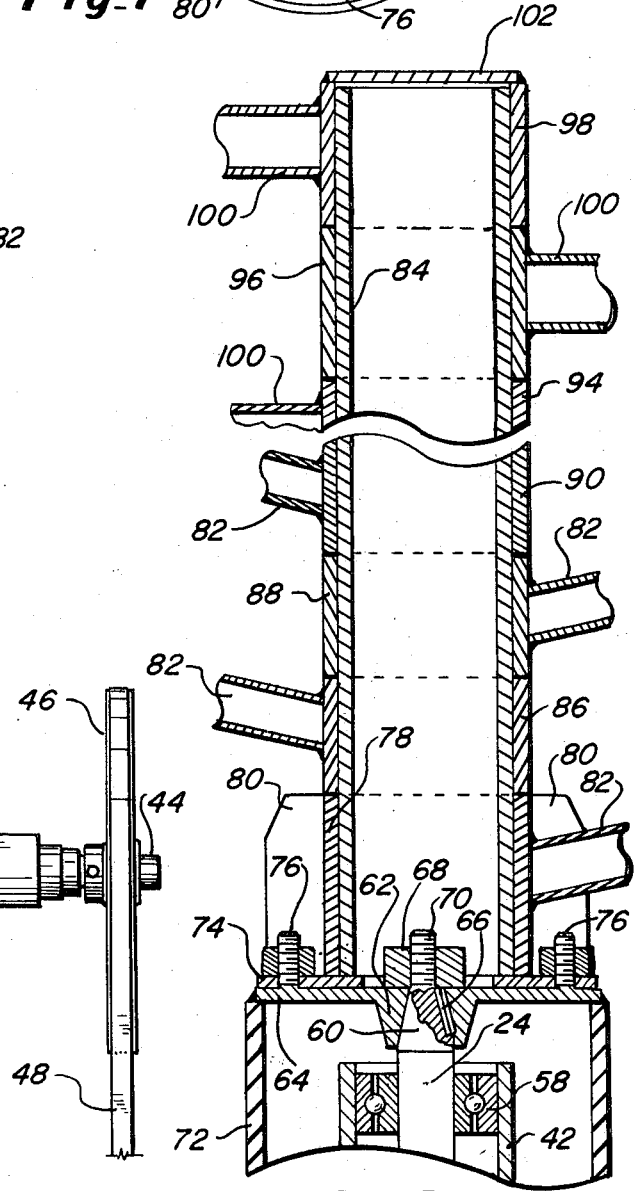

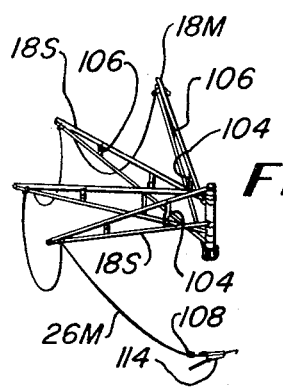
Fig_9
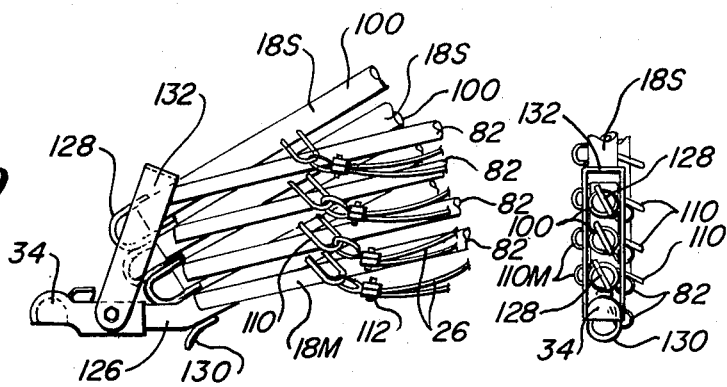
Fig_13  Fig_14
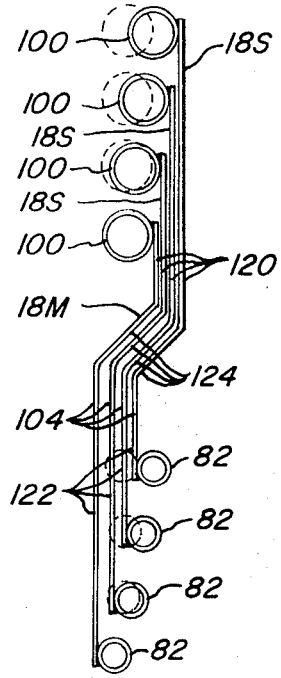
Fig_10
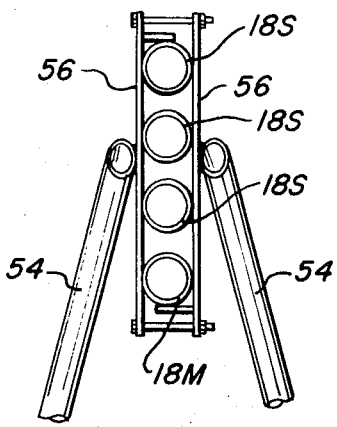
Fig_11
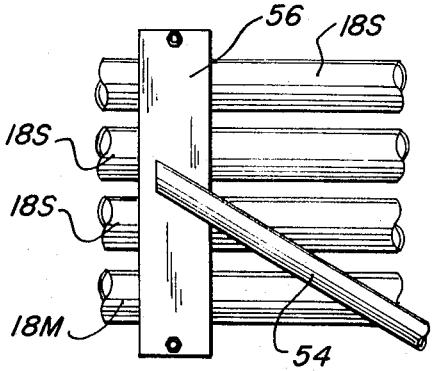
Fig_12
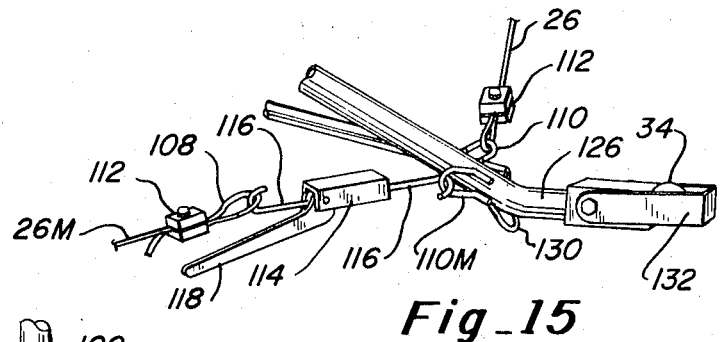
Fig_15
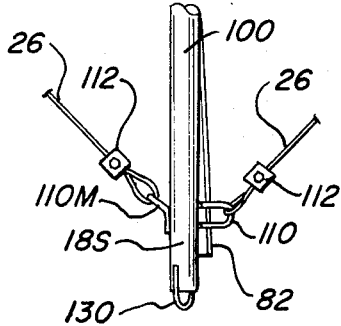
Fig_16

HORSE WALKER

Mechanical exercise devices are quite old in the art, one common example being a treadmill. Larger animals like racehorses are oftentimes exercised by attaching their halter to a rope hanging from an overhead rotating boom that is driven at a speed which forces the animal to walk around at a speed sufficient to give them the needed exercise. While such mechanical conditioning is really no substitute for exercise under the direction of a skilled rider, however, situations occasionally arise, especially with a string of several horses at a racing meet or the like, when there aren't enough riders available to personally exercise each horse properly. In situations such as these, mechanical walkers are often relied upon.

The prior art mechanical horse walkers generally consist of permanent installations erected in the training areas of race tracks, stables, show rings and other such facilities, however, relatively few of such places have a mechanical exercise unit and, therefore, a portable one would answer a long felt need. A practical walker would require little, if any, disassembly to ready it for movement from one site to another. Also, it should be transportable over state highways rather than just along private roads for obvious reasons. Furthermore, one or at most two people must be able to either set it up or take it down quickly and easily if the unit is to be practical.

It has now been found in accordance with the teaching of the instant invention that these and other sought after objectives of a portable animal exercise unit can, in fact, be achieved through the use of a trailer-mounted unit having a single driven radially extending boom and one or more foldable booms that are pulled around by the latter during operation and are stowed in nested relation while it is being transported from place to place or stored. The several booms are held in their extended angularly disposed operative relation by flexible cables that can be left attached when they are folded. Also, by driving only a single boom, no clutch or disconnect mechanism is required because the freely rotatable ones can always be moved relative to the driven one.

Accordingly, the principal object of the invention is to provide a novel trailer-mounted foldable animal exerciser.

A second objective is the provision of a device of the class described which is designed for movement along public highways.

Another object of the within described invention is to provide a horse walker that can be folded and unfolded simply and easily by one person.

Still another objective is the provision of a unit for mechanically exercising animals, particularly horses, that includes a series of two or more long radially-extending rigid booms foldable into a tight, compact nested relation when not in use.

An additional object of the invention herein disclosed and claimed is the provision of an exercise unit for animals which has a single driven boom with all the other booms freely movable relative thereto and to one other so that they needn't be disconnected from the drive.

Further objects are to provide a mechanical walker for horses and the like that is simple, easy to use, rugged, relatively inexpensive, versatile, lightweight, cheap to operate and even decorative in appearance.

Other objects will be in part apparent and in part pointed out specifically hereinafter in connection with the description of the drawings that follows, and in which:

FIG. 1 is a perspective view looking down upon the portable horse walker of the present invention from a vantage point above the left rear corner thereof;

FIG. 2 is a left side elevation of the unit to a slightly enlarged scale;

FIG. 3 is a front elevation to the same scale as FIG. 2;

FIG. 4 is a rear elevation to the same scale as FIGS. 2 and 3;

FIG. 5 is another side elevation similar to FIG. 2 and to the same scale as the latter but showing the unit in stowed condition and attached to a towing vehicle;

FIG. 6 is a fragmentary detail to an enlarged scale showing how an ordinary automobile differential is employed as a geared-down right angle drive for rotating the booms by means of a belt and pulley power transfer mechanism from an electric motor on the trailer;

FIG. 7 is a section taken along line 7—7 of FIG. 6 to a further enlarged scale;

FIG. 8 is a fragmentary diametrical section of the center post to the same scale as FIG. 7, portions having been broken away to conserve space;

FIG. 9 is a fragmentary perspective view from the same vantage point as FIG. 1 but to a somewhat smaller scale showing the booms between their nested and fully extended positions;

FIG. 10 is a section taken along line 10—10 of FIG. 5 but to a much larger scale showing the manner in which the booms nest one within the other just before they reach their fully-nested condition;

FIG. 11 is a fragmentary section taken along line 11—11 of FIG. 5 to the same scale as FIG. 10 showing the bracket and strut subassembly used to hold the booms in nested relation while being transported;

FIG. 12 is a fragmentary side elevation of the latter subassembly;

FIG. 13 is a fragmentary side elevation to a slightly reduced scale showing the free ends of the booms retained in stacked and nested relation by a U-shaped clip;

FIG. 14 is a fragmentary front elevation of the subject matter of FIG. 13 to the same scale;

FIG. 15 is a fragmentary perspective view looking down and toward the rear from the right side of the main boom showing how a chain-tightener is used to cinch up the cables that hold the boom assembly in fixed angularly spaced relation to one another; and, FIG. 16 is a fragmentary top plan view to the same scale as FIG. 15 showing the eyes and permanent cable connections on both sides of the slave booms along with the lead rope eye in the end thereof.

Referring next to the drawings for a detailed description of the present invention and, initially, to FIGS. 1–5, inclusive, for this purpose, reference numeral 10 has been chosen to broadly designate the horse walker which will be seen to include a two-wheel trailer 12 having a center post 14 resting on the bed 16 thereof from which a plurality of radially extending foldable booms 18 emanate. A platform 20 hingedly attached to the bed of the trailer carries an electric motor 22 which drives a shaft 24 (FIGS. 6, 7 and 8) journalled for rotation within the center post that, in turn, is operatively coupled to the main boom 18m to form a driving connection therewith. Main boom 18m is connected to the slave booms 18s by cables 26. Detachably connected to the extremities of each boom are short lead ropes 28 which attach to the halter 30 of the horse 32 being exercised by the unit.

The trailer 12 has its bed 16 tilted upwardly and to the rear at an angle of about 30° or so above the horizontal when the socket 34 on the free end of the main boom 18m is fastened in place to the trailer hitch 36 on the rear end of the towing vehicle 38 as shown in FIG. 5. In this attitude, the wheels 40 occupy their conventional ground engaging position shown and the booms slant downwardly and forwardly at the same angle to the horizontal as the bed 16. Except when in position to be towed as revealed in FIG. 5, however, the trailer bed 16 rests on the ground and defines a skid as shown in FIGS. 1–4, inclusive. As such, the skid-forming trailer be 16 cooperates with the wheels 40 to produce a tripod-like three-point support for the center post 14 which is essentially vertical.

Center post 14, in the particular form shown, comprises an automobile differential, the axle housings 42 of which stand atop the trailer bed 16 at right angles thereto so as to remain vertical when said bed is flat on the ground as shown in FIGS. 1–4. This arrangement leaves the input shaft 44 to the differential which ordinarily connects on to the drive shaft extending out to the side where a large diameter V-belt pulley 46 is attached thereto. The latter pulley is operatively connected to the electric motor 22 by means of V-belt 48 and motor shaft pulley 50, the latter belt and pulley power transfer mechanism cooperating with the differential gearing to substantially reduce the speed of shaft 24 which is actually one of the axles. The hinged platform 20 comprises a Rockwood-type motor mount adapted to maintain constant belt tension.

Permanent struts 52 extend from the bed of the trailer and axle housing 54 up to the post 14 where they act as braces for the latter. A second set of detachable struts 54 shown in FIGS. 5, 11 and 12 are used only in the stowed condition with bracket 56 to keep the booms nested one within the other as will be explained presently.

Next, with reference to FIGS. 6, 7 and 8, it will be seen that the drive shaft 24 is journalled for rotation within bearing 58 in the upper end of the axle housing 42. This shaft, of course, is operatively connected to shaft 44 by the conventional gearing within the differential housing, none of which has been illustrated. The frusto-conical section 60 of the shaft 24 is keyed to the hub 62 of drive flange 64 by key 66. A nut 68 on the threaded tip 70 of the drive shaft 24 holds the drive flange in place thereon for conjoint rotational movement. Actually, all of the above-described elements are parts of the rear drive wheel assembly of an automobile, even the drive flange 64 comprising a brake drum with the circumferential skirt shown in phantom lines in FIG. 6 removed and replaced by a tubular dust cover 72.

A centrally-apertured plate 74 is bolted onto the wheel-mounting studs 76 of flange 64 as shown. A short upstanding collar 78 is welded to the top of plate 74 and reinforced by a plurality of equiangularly spaced radially extending webs 80 attached between it and said plate. The lower arm 82 of the main boom 18m is permanently fastened to collar 78 so as to extend outward radially therefrom. Thus, when shaft 24 rotates, it will, in turn, rotate the main boom 18m through key 70, hub 62, drive flange 64, studs 76, plate 74, reinforcing flanges 80 and collar 78. This is the only driving connection between the drive mechanism and the booms, all of the slave booms 18s being pulled around by the main boom 18m and the system of interconnecting cables 26 rigged therebetween.

Now, loosely telescoped into collar 78 is a tubular sleeve 84 which projects well above the upper end of the latter. Telescoped down over sleeve 84 and stacked one above the other atop fixed collar 78, are a series of seven loose collars 86, 88, 90, 92, 94, 96 and 98, all of which have been clearly revealed in FIG. 6. The three lower loose collars 86, 88 and 90 have the lower arms 82 of the three slave booms 18s attached thereto so as to extend out radially at an angle tilted up above horizontal at an angle of 15° or so. The upper three loose collars 94, 96 and 98, each carry the upper arms 100 of the slave booms 18s while the single remaining loose collar 92 carries the upper arm 100 of the main boom as shown most clearly in FIG. 6.

Starting at the bottom of the series of collars stacked on sleeve 84, the lower arm 82 attached to fixed collar 78 attaches at its outer end to the upper arm 100 connected to loose sleeve 92 thus producing the main boom 18m that drives the system. Note that the collar 92 is much longer than any of the others and, as such, it provides a good deal more structural strength for the main boom which is under greater stress due to its driving connection and, in addition, this same long collar cooperates with the loose sleeve stacked between it and the fixed sleeve 78 to set the spacing between the arms of each of the four booms at their inner ends.

In a similar manner, collars 86 and 94 cooperate with their respective lower and upper arms 82 and 100 to define the lowermost of the three slave booms 18s, collars 88 and 96 and their boom arms define the middle of the three slave booms, and collars 90 and 98 cooperate in the same manner with the arms depending therefrom to produce the uppermost slave boom. It can also be seen that the uppermost collar 98 is covered by a plate 102 that cooperates therewith to define a cap covering sleeve 84. Obviously, while four such booms are shown spaced 90° apart, two or more booms can be used arranged in equiangularly spaced relation around the center post.

Returning again to FIGS. 1, 2 and 5, it can be seen that each of the booms 18 is preferably provided with at least one, and preferably two, braces located intermediate its ends, the one nearest the center post having been identified by reference numeral 104 while the one outboard thereof near the outer end carries identifying number 106. These braces are vertically disposed and interconnect the upper and lower arms of each boom as shown, the one farthest from the center post being the shorter of the two due to the convergent relation of the arms. In addition, in each set of four such braces, no two are alike as will be explained presently in connection with FIG. 10.

With reference in particular to FIG. 5 and FIGS. 10–16, inclusive, FIGS. 13 and 14 will be seen to most clearly reveal the fact that the lower arms 82 of each boom fasten alongside the upper arms 100 thereof rather than underneath as might be expected. By so doing, all four of the upper boom arms can be brought into a vertically stacked relation to one another as seen by the phantom lines in FIG. 10 and the full lines in FIGS. 11 and 14. Obviously, the lower arms 82 alongside thereof also end up in a vertically stacked relationship when fully nested as seen, once again, in phantom lines in FIG. 10. Thus, by disconnecting the one free end 108 of modified cable 26m that detachably connects the outer end of the uppermost slave boom to the tongue-carrying end 34 of the main boom 18m, all three slave booms can be swung around clockwise as viewed in FIG. 9 until they assume the fully-nested relation of FIGS. 5, 11, 13 and 14. When not in use, these connecting cables 26, which preferably remain attached except for end 108 of cable 26m, are just pulled up alongside the nested booms as shown in FIG. 5 where they are tied off in any suitable manner. Note particularly in FIG. 13 that U-shaped eyes 110 are welded to the upper arms of each boom on the same side thereof as that to which the lower arm is attached but far enough inwardly of these points of attachment to permit said lower arms to pass therebeneath. In fact, in the particular form illustrated, these eyes tilt downwardly and the parallel portions thereof are welded to the top of the lower legs. One end of each cable 26 is passed through the eye 110, looped around the latter and secured by a cable clamp 112, all of which is most clearly revealed in FIGS. 13–16, inclusive. With the exception of the free end 108 of modified cable 26m, the other ends of each of the three remaining cables are similarly attached to eyes 112m on the side of the upper arm of each boom opposite that to which the lower arm is attached. With the cables thus attached and adjusted to length, the lowermost slave boom should be spaced 90° angularly in a counterclockwise direction from the main boom as viewed in FIG. 1, th middle slave boom 90° away from the lowermost one, the upper slave boom 90° from the middle one and, lastly, the main boom 90° from the uppermost one. Now, in order to maintain this relationship, the free end of the modified cable 26m which has its other end permanently attached to the uppermost slave boom, will be detachably connected to the main boom by means of conventional chain tightener 114 as shown in FIG. 15. Thus, chain tighteners 114 will be employed in the usual manner to draw all the cables 26 taut and ready for use. In the particular form shown, tightener 114 has hooks 116 on both ends, one hook into the loop in the detachable free end 108 of cable 26m and the other to hook into eye 112 carried on the near side of main boom 18m as shown in FIG. 15. Handle 118 becomes effective when actuated to move the hooks closer together.

Several elements of the boom structure coact with one another to enable them to nest, the first of these being the braces 104 and 106 for a detailed description of which reference will now be made to FIGS. 5 and 10. To begin with, each set of four braces has the elements thereof offset with respect to one another as seen quite clearly in FIG. 5. Thus, since the upper and lower boom arms connected by these braces are in convergent relation from the center post out, the innermost brace is longer than the adjacent one outboard thereof and so on out to the shortest of the four braces. This, of course, is true of both the inboard set 104 and the outboard set 106 with the former all being longer than the longest of the latter.

Now, as seen in FIG. 10, each brace extends from one side of the upper brace arm to the opposite side of the lower brace arm, and, in so doing, is shaped to include upper and lower substantially parallel sections 120 and 122, respectively, interconnected by an angled section 124 therebetween that offsets one from the other. The upper section 120 of the uppermost boom is long enough to pass in front of all the upper boom arms in stacked relation as shown, while the lower section 122 thereof is the shortest of the four. The upper section 120 of the brace for the middle slave boom, on the other hand, is somewhat shorter in that it must only pass in front of the upper arms of the lowermost slave boom and the main boom, however, its lower section 122 has to be correspondingly longer so as to pass behind the lower arm of the middle slave boom. This adjustment in the relative lengths of the upper and lower sections of braces continues in this way until the main boom brace has the shortest of the four upper sections 120 because it doesn't have to pass in front of any of the other three upper boom arms; yet, its lower section 122 is the longest of the four in that it must pass behind all three lower boom arms thereabove. The terms "front" and "rear" as used above refer to the directions in which the booms fold and unfold. In other words, the booms unfold to the right as seen in FIG. 4, therefore, a position to the right or ahead of the unfolding booms would be in "front" thereof while one to the left would be "behind" them. While the braces shown have straight sections separated from one another by abrupt bends, this needn't be the case and gentle shallow generally S-curved braces will work just as well.

A look at FIGS. 5, 10 and 11 will reveal that the booms can easily move into the fully-nested vertically-stacked relation shown by full lines in FIG. 11 and phantom lines in FIG. 10 from the slightly open position revealed in full lines in FIG. 10 without either the arms 82 and 100 or the braces 104 and 106 interfering with one another provided only that the slave booms are swung to the right away from the main boom.

In FIGS. 5, 11 and 12 to which reference will now be made, the manner of securing the booms in fully nested condition and bracing them so that they extend forwardly at right angles to the trailer axle will be described. Bracket 56 comprises nothing more than a pair of sideplates bolted top and bottom with the upper boom arms sandwiched therebetween. The struts 54 are attached to opposite sides of bracket 56 and diverge downwardly and rearwardly therefrom to points of detachable connection on the trailer frame adjacent the wheels as seen in FIG. 5.

Further, in connection with FIGS. 13, 14 and 15, it will be seen that the upper arm of the main boom is extended to form a tongue 126 that carries the trailer hitch socket 34, whereas, the upper arms of the slave booms are each equipped with a tilted eye 128 that are most clearly revealed in FIG. 14. These eyes receive the detachable lead ropes 28 while a similar eye 130 on the underside of the upper arm of the main boom performs an identical function for the latter. By tilting eyes 128 in the same direction as shown in FIG. 14 before fastening them to the upper arm ends, they nest and permit the latter to fit down atop one another in snug vertically stacked relation.

As a further precaution to maintain the vertically stacked relationship of the booms, an inverted U-shaped clip 132 is pivotally attached to the tongue-like extension of the main boom in position to flip back over the front ends of the slave booms as shown most clearly in FIGS. 5, 13 and 14 from its inoperative position of FIG. 15. No special way has been shown to hold the clip in its operative boom-retaining position, a short length of baling wire having proven quite adequate.

Finally, referring once more to FIG. 5 with the booms in folded vertically stacked position ready to be moved, the trailer safety chain 134 can, if desired, be attached to main boom eye 130 which is not, at this point, being used for any other purpose. As thus folded and secured, the entire unit is ready to be hauled at highway speeds behind any suitable towing vehicle.

What is claimed is:

1. The towable and collapsable animal exercise apparatus which comprises: a trailer having a wheel-supported bed; an upstanding rigid center post mounted atop the trailer bed; means defining a drive shaft journalled for rotation within the center post; drive means including a motor connected to the drive shaft and operative upon actuation to rotate same; a driven boom extending radially outward from the center post connected to the drive shaft for conjoint rotation therewith; one or more slave booms mounted on the center post for independent rotational movement relative to one another and to the driven boom between a stowed condition in vertically stacked relation and a spread position in angularly spaced relation; connecting means operatively linking the booms together for conjoint rotation in spread position upon rotation of the driven boom; releasable retaining means effective to maintain the booms in stowed condition; and, means on the outer end of each boom for attaching a lead line thereto.

2. The animal exercise apparatus as set forth in claim 1 in which: means comprising a tongue adapted for detachable connection to a trailer hitch depends from the free end of one of the booms.

3. The animal exercise apparatus as set forth in claim 2 in which: the driven boom is the lowermost boom of the several booms; and, in which the tongue comprises an extension of the driven boom.

4. The animal exercise apparatus as set forth in claim 2 in which: the trailer bed and wheels cooperate with one another to define a tripod-like base effective to support the center post in substantially vertical position.

5. The animal exercise apparatus as set forth in claim 4 in which: the trailer bed is substantially perpendicular to the center post and lays flat upon the ground to define a skid-plate when said center post is vertical.

6. The animal exercise apparatus as set forth in claim 4 in which: the booms in spread position have their outer ends elevated to a level above that of the trailer hitch of a towing vehicle, said booms in stowed condition upon being lowered into position for attachment to the latter cooperating with the trailer wheels to elevate the bed thereof free of the ground.

7. The animal exercise apparatus as set forth in claim 1 in which: each boom includes upper and lower rigid arms arranged in angularly-disposed relation to one another so as to converge at their outer ends, the inner ends thereof being aligned one above the other while their outer ends are fastened together in side-by-side relation, and in which the several upper boom arms cooperate with one another in stowed condition to produce a stack thereof while said lower boom arms cooperate to define a second stack alongside the first.

8. The animal exercise apparatus as set forth in claim 7 in which: each boom has at least one brace intermediate the ends thereof bridging the gap between its upper and lower arms, the braces of the several booms being off-set with respect to one another so as to occupy a side-by-side relation in the stowed condition of the latter, and said braces each being individually shaped and connected on opposite sides of their respective boom arms so as to permit the several booms to assume a nested relation in said stowed condition wherein said upper boom arms are positioned one above the other in vertically stacked relation.

9. The animal exercise apparatus as set forth in claim 8 in which: each brace is shaped to define a shallow generally S-shaped curve having upper and lower limbs with the adjacent ends thereof interconnected by an angularly disposed medial portion, the overall length of each brace in a set thereof being different from the other braces in the same set, and the angularly-disposed portion being located relative to the limbs connected thereby such that they cross over the boom on to the other side thereof through the gap left between the lowermost upper boom arm and the uppermost lower boom arm.

10. The animal exercise apparatus as set forth in claim 1 in which: the connecting means comprise flexible cable-forming means strung between points outboard of the common axis of rotation on adjacent booms.

11. The animal exercise apparatus as set forth in claim 10 in which: all but one of the cable-forming means have both ends thereof permanently connected to one of the slave booms, the remaining cable has one end permanently connected to one of the slave booms adjacent hthe driven boom and the other end detachably connected to the latter.

12. The animal exercise apparatus as set forth in claim 11 in which: cable-tightening means is interposed between the detachable end of said remaining cable-forming means and the driven boom.

13. The animal exercise apparatus as set forth in claim 1 in which: the releasable retaining means comprises an inverted generally U-shaped yoke mounted for pivotal movement about a transverse axis from a retracted inoperative position into an extended one operatively bridging the booms and holding same in stacked relation.

14. The animal exercise apparatus as set forth in claim 13 in which: the main boom is the lowermost of the several booms; tongue-forming means adapted for attachment to a trailer hitch defines an extension of the driven boom; and, in which the yoke is pivotally attached to such extension in position to embrace the slave booms in operative position 15. The animal exercise apparatus as set forth in claim 1 in which: the releasable retaining means comprises bracket means spanning corresponding portions of each boom and connected thereto so as to maintain same in stacked relation, and detachable strut means extending from the bracket means in divergent relation to points of attachment on opposite sides of the trailer, said strut means cooperating with said bracket means to define braces effective to hold the booms at right angles to the axis of trailer wheel rotation when in stowed condition.

16. The animal exercise apparatus as set forth in claim 1 in which: the driven boom is the lowermost one and has a tubular drive collar on its inner end operatively connected to the drive shaft for coaxial rotation therewith, an elongate sleeve is telescoped down into the drive collar so as to leave a substantial portion of its length projecting thereabove, and in which each of the slave booms carries a collar on its inner end telescoped down over the sleeve for free rotation relative thereto and to the drive collar, said slave boom collars being stacked one above the other atop the drive collar.

17. The animal exercise apparatus as set forth in claim 16 in which: each of the booms includes upper and lower arms having their inner ends spaced apart approximately the same distance; collars are attached to the inner ends of both arms of each boom in coaxial relation to one another; the collar on the lower arm of the driven boom comprises the drive collar; the collars on the lower arms of the slave booms are telescoped down over the sleeve and stacked one atop the other on the drive collar; the collar on the upper arm of the driven boom is telescoped down over the sleeve and rests atop the uppermost collar carried on the inner ends of the lower slave boom arms; and, in which the collars on the upper arms of the slave booms are telescoped down over the sleeve and stacked one above the other atop the collar on the upper arm of the driven boom, said last-mentioned slave boom collars being stacked in the same order as the slave boom collars on the ends of the lower arms.

* * * * *